United States Patent [19]

Hassler, Jr.

[11] Patent Number: 4,616,793
[45] Date of Patent: Oct. 14, 1986

[54] REMOTE PIVOT DECOUPLER PYLON: WING/STORE FLUTTER SUPPRESSOR

[75] Inventor: John M. Hassler, Jr., Fort Worth, Tex.

[73] Assignee: The United States of America as represented by the Administrator of the National Aeronautics and Space Administration, Washington, D.C.

[21] Appl. No.: 690,274

[22] Filed: Jan. 10, 1985

[51] Int. Cl.[4] .............................................. B64C 1/22
[52] U.S. Cl. ............................ 244/137 A; 244/17.27; 244/118.1; 89/1.54; 248/638
[58] Field of Search ............ 244/137 A, 118.1, 17.27; 89/1.54; 248/638

[56] References Cited

U.S. PATENT DOCUMENTS

| | | | |
|---|---|---|---|
| 3,044,818 | 7/1962 | Tobey | 244/137 A |
| 3,176,939 | 4/1965 | Mard et al. | 244/137 A |
| 3,268,188 | 8/1966 | La Roe et al. | 244/118.1 |
| 3,679,154 | 7/1972 | Nichols et al. | 244/137 R |
| 3,698,663 | 10/1972 | Balke et al. | 244/17.27 |
| 3,854,680 | 12/1974 | Hasquenoph et al. | 244/137 R |
| 3,854,681 | 12/1974 | Hasquenoph et al. | 244/137 A |
| 3,858,831 | 1/1975 | Halwes | 244/17.27 |
| 3,904,156 | 9/1975 | Smith | 244/118.1 |
| 4,168,046 | 9/1979 | Hasquenoph et al. | 244/137 R |
| 4,343,447 | 8/1982 | Reed, III | 244/137 A |
| 4,502,652 | 3/1985 | Breitbach | 244/137 A |

Primary Examiner—Galen Barefoot
Assistant Examiner—Lynn M. Fiorito
Attorney, Agent, or Firm—Howard J. Osborn; Wallace J. Nelson; John R. Manning

[57] ABSTRACT

This is a device for suspending a store 66 from an aerodynamic support surface, such as an aircraft wing 12, and more specifically for improving upon single pivot decoupler pylons by reducing both frequency of active store alignment and alignment system space and power requirements. In the described embodiment, two links 36 and 42 suspend a lower pylon/rack section 60, and releasably attached store 66, from an upper pylon section 16 mounted under wing 12. Links 36 and 42 allow lower pylon section 66 to rotate in pitch about a remote pivot point 68. A leaf spring 30 connected between lower section 60 and electrical alignment system servomechanism 18 provides pitch alignment of the lower section 60/store 66 combination. Servomechanism 18 utilizes an electric servomotor 20 to drive gear train 21 and reversibly move leaf spring 30, thereby maintaining the pitch attitude of store 66 within acceptable limits. Damper 54 strokes when lower section 60 rotates to damp large oscillations of store 66.

3 Claims, 1 Drawing Figure

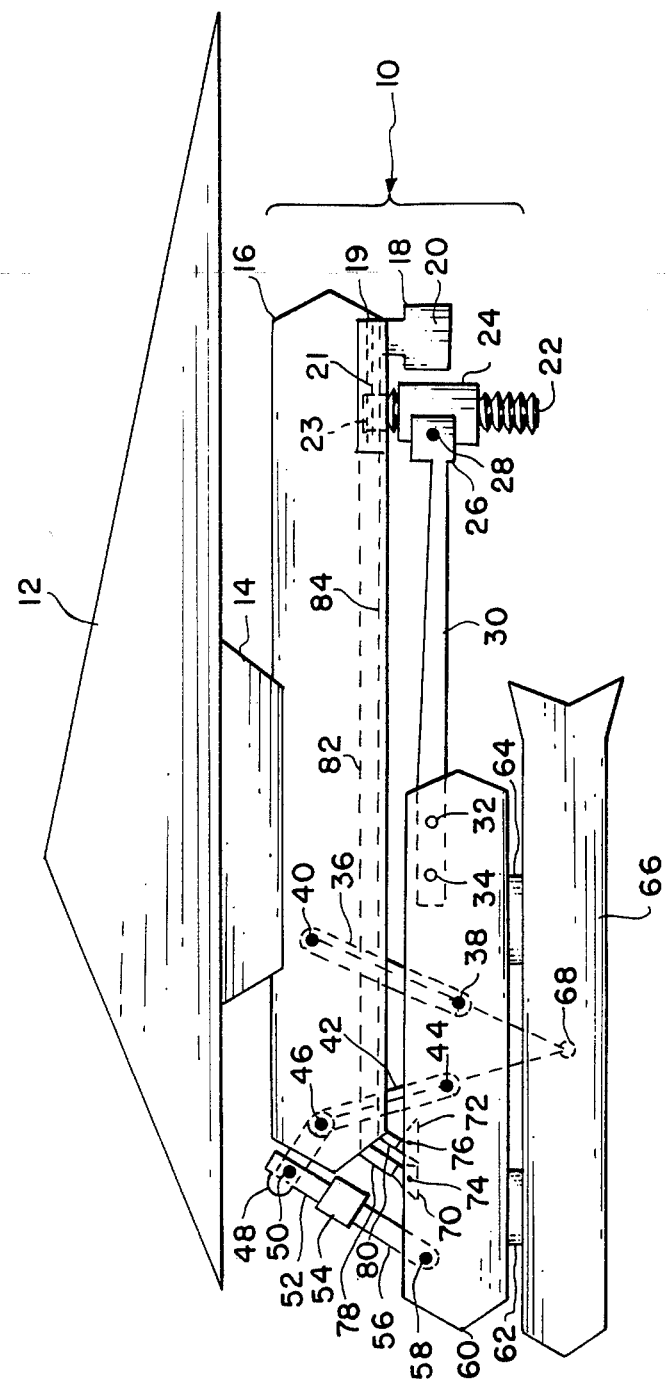

REMOTE PIVOT DECOUPLER PYLON: WING/STORE FLUTTER SUPPRESSOR

ORIGIN OF THE INVENTION

The invention described herein was made in the performance of work under a NASA contract and is therefore subject to the provisions of Section 305 of the National Aeronautics and Space Act of 1958, Public Law 85-568 (72 Stat 435; 42 USC 2457).

BACKGROUND OF THE INVENTION

This invention was developed to improve upon the single pivot decoupler pylon. The decoupler pylon is designed to suppress flutter and vibration of aerodynamic structures carrying pylon-mounted stores. Such stores are most commonly found under aircraft wings or fuselages in the form of weapons or fuel tanks.

The flutter desired to be suppressed is a dangerous aerodynamic instability affecting lifting surfaces moving through fluids at sufficiently high velocities. The velocity at which flutter develops in a given structure is that structure's characteristic flutter speed. Flutter speed can be a critical limitation on an aircraft's operating envelope: flying in excess of the flutter "speed limit" can result in catastrophic disintegration of the aircraft. The attachment of stores to an aircraft typically restricts its operating envelope by reducing the flutter speed. This effect is caused by the coupling of store oscillations with support surface oscillations, thus resulting in compound oscillations of dangerous magnitude developing at lower velocities. The decoupler pylon, then, suppresses flutter by decoupling the store oscillations from the support surface oscillations.

Another problem presented by flutter other than its potential for destruction of aircraft is its unpredictability; although store-induced flutter speed reductions are easily observed, such reductions are difficult to quantitatively predict. In the case of military aircraft, the difficulty of prediction is largely due to the multiple store configurations dictated by modern combat and surveillance capability requirements: a single aircraft commonly must have the flexibility to accommodate different numbers of different store types at different locations on the aircraft. These differences in store number, type, and mounting location give rise to complex multi-variable oscilation coupling patterns, and can give an aircraft as many different flutter speeds as store configurations. The theory of such store coupling is not well developed, and thus determining all of the possible flutter speeds usually requires extensive testing. The decoupler pylon, then, by suppressing flutter, obviates the need for extensive testing to determine flutter speed reductions.

Reed's single pivot pylon, shown in U.S. Pat. No. 4,343,447, comprised both passive and active suppression elements; Reed's pylon used dashpot-type passive elements and a low frequency servo control active element. A damper was also employed to damp transient oscillations of an attached store. This pylon effectively suppressed flutter of the store/support surface combination, but the single pivot design had some drawbacks. Among these drawbacks were the following: a (relatively) high number of store excursions, a high maximum pitch deflection angle, a high frequency of alignment control system activation, high force and power requirements for the alignment system, and a relatively large space requirement for the alignment system.

Accordingly, it is an object of the present invention to provide a flutter-suppressing decoupler pylon permitting fewer store excursions than permitted by a single pivot decoupler pylon.

Another object of this invention is to provide a decoupler pylon permitting a smaller maximum pitch deflection angle than permitted by a single pivot decoupler pylon.

Another object of the invention is to provide a decoupler pylon requiring less frequent activation of its alignment control system than required by a single pivot decoupler pylon.

Another object of this invention is to provide a decoupler pylon having smaller force and power requirements for its alignment control system than those of a single pivot decoupler pylon.

Another object of this invention is to provide a decoupler pylon requiring less mounting space on a support surface than required by a single pivot decoupler pylon.

Yet another object of this invention is to provide a decoupler pylon with a remote pivot.

SUMMARY

These and other objects are achieved by a remote pivot decoupler pylon having, among other elements, two pivoting links that permit store rotation about a remote pivot point, a leaf spring that passively decouples store pitch from a support surface, and an electrical alignment system that corrects excessive static pitch deflections.

The two links connect the support-mounted upper portion of the pylon to a movable lower portion. The movable lower pylon portion allows the store to rotate in pitch about an imaginary remote pivot point within a path defined by the two links.

The leaf spring restricts motion of the store in two ways, as it is attached both to the lower pylon portion and to the electrical alignment system. In the more prevalent, passive mode, the leaf spring decouples dynamic store deflections from the support by passively damping the pivoting motion of the store. In the less prevalent, active mode, the leaf spring offsets static store deflections by moving the lower pylon portion; an electric motor in the alignment system drives a gear train that raises and lowers the leaf spring to restore proper store pitch.

A damper may also be employed between the upper and lower pylon portions. This damper acts in tandem with the leaf spring to damp transient oscillations of the store. Such oscillations commonly occur when the store is subjected to violent gust loads.

BRIEF DESCRIPTION OF THE DRAWING

The single FIGURE is a schematic cross-sectional view of the remote pivot decoupler pylon.

DETAILED DESCRIPTION OF THE INVENTION

Referring now to the drawing, there is shown a wing 12 with store 66 attached by a remote pivot decoupler pylon generally designated by the numeral 10. The decoupler pylon 10 has two major parts: a fixed upper section 16 conventionally attached to wing 12 with a brace 14, and a movable lower section 60 attached directly to store 66 by releasable hooks 62 and 64 or by other conventional release mechanisms. Upper pylon section 16 holds lower section 60 with two links: front link 42 pinned to upper section 16 by pin 46 and to lower section 60 by pin 44; and rear link 36 pinned to upper section 16 by pin 40 and to lower section 60 by pin 38. Links 42 and 36 allow lower section 60 to pivot about an imaginary pivot point 68: this pivoting action allows attached store 66 to assume a variety of pitch attitudes.

The pivoting action of lower pylon section 60 is restricted by a leaf spring 30. One end of leaf spring 30 is joined to lower pylon section 60 by pins 32 and 34. The opposite end of leaf spring 30 is a clevis-type arm 26 that is held to a threaded sleeve 24 by pin 28. Sleeve 24 is threaded onto shaft 22 and shaft 22 is provided with a gear 23 fixed at one end thereof and meshing with a gear train 21 to induce rotation of shaft 22. Gear train 21 is driven by the electric servomotor 20 of a servomechanism 18. Servomechanism 18 is bolted or otherwise conventionally secured to upper section 16 through mount 19 and is activated via two wires 82 and 84 running from switches 78 and 80, respectively. Switches 78 and 80 are depressed or released by cams 70 and 72, respectively. Cams 70 and 72 are held to lower pylon section 60 by pins 74 and 76, respectively.

Motion of lower pylon section 60 is also restricted by damper 54. Damper 54 attaches to lower section 60 by pin 58 running through lower damper shaft 56. Damper 54 attaches to upper section 16 indirectly via damper link 48; upper damper shaft 52 is connected to link 48 by pin 50, and link 48 is connected to upper section 16 by pin 46.

In one specific embodiment of the present invention, a GBU-8 (Glide Bomb Unit) store 66 was attached by a remote pivot decoupler pylon 10 to an F-16 aircraft wing 12. The lower pylon section 60 was connected to a leaf spring 30 specially tailored to the GBU-8 store 66; leaf spring 30 was made with a stiffness that prevented store 66 from reaching a frequency mode that could couple with the basic wing 12 frequency. Servomechanism 18 controlled a servomotor 20 that was linked through a gear train 21 to threaded shaft 22. The system was irreversible due to the electric brake in servomotor 20. Store 66 was suspended from a standard MAU-12-D/A rack shown schematically as lower pylon section 60 with hooks 62 and 64.

In operation of the described preferred embodiment, links 36 and 42 allowed rack section 60 to rotate in pitch during flight. Damper 54 stroked when rack section 60 rotated, thereby damping transient oscillations of store 66. Leaf spring 30 provided pitch motion stiffness for the rack section 60 and attached store 66, and was used to provide pitch alignment of the rack section 60/store 66 combination.

Servomechanism 18 was activated when the section 60/store 66 combination changed in pitch by $\pm\frac{1}{2}°$ from a preset null position. When rack section 60 pivoted backwards and assumed a positive pitch (with store 66 nose-up) greater than $\frac{1}{2}°$, cam 72 turned about pin 76 and depressed rear switch 80. Switch 80 activated servomechanism 18 through control wire 84. Electric servomotor 20 then drove gear train 21 which turned threaded shaft 22. The turning of shaft 22 caused threaded sleeve 24 to move vertically up shaft 22. Sleeve 24 transmitted this upward motion to leaf spring 30 through the attachment of clevis arm 26 and pin 28. Raising leaf spring 30 caused rack section 60 to move forward and thus pivot about remote pivot point 68. This pivoting action restored store 66 to within $\frac{1}{2}°$ of the preset null position, whereupon switch 80 was released. The release of switch 80 deactivated servomechanism 18 through control wire 84.

The response of servomechanism 18 to a negative pitch (with store 66 nose-down) was very similar to that response described above. When rack section 60 pivoted forward and assumed a negative pitch less than $-\frac{1}{2}°$, cam 70 turned about pin 74 and depressed front switch 78. Switch 78 activated servomechanism 18 through control wire 82. Electric servomotor 20 then drove gear train 21 which turned shaft 22. The turning of shaft 22 caused sleeve 24 to move vertically down shaft 22. Sleeve 24 transmitted this downward motion to leaf spring 30 through the attachment of clevis arm 26 and pin 28. Lowering leaf spring 30 caused rack section 60 to move backward and thus pivot about remote pivot point 68. This pivoting action restored store 66 to within $\frac{1}{2}°$ of the preset null position, whereupon switch 78 was released. The release of switch 78 deactivated servomechanism 18 through control wire 82.

While only leaf spring 30 corrected static pitch deflections, both damper 54 and leaf spring 30 damped dynamic pitch oscillations. Leaf spring 30 provided stiffness to achieve decoupling of store 66 and wing 12 modes, whereas damper 54 stroked to restrain large magnitude oscillations.

In one study comparing the remote pivot decoupler pylon 10 to a single pivot decoupler pylon, the two pylon designs were subjected to F-16 aircraft maneuver loads to determine the store pitch deflection which is directly related to the alignment force required. The limit inertia flight load factors of airborne stores, associated suspension lugs, and aircraft-store interface were used in the evaluation of the two designs; these criteria were used during the feasibility study to determine the maximum store pitch angles. The feasibility study pitch angles and the angles for the two current candidate designs are presented on Table I. The feasibility study design data is presented for the case with the store center of gravity directly below the pylon pivot. Two designs with a single pivot were under consideration. The first has the store center of gravity directly below the pylon pivot location. The second design has the pylon pivot three inches forward of the store center of gravity. The store pitch angles of both configurations are shown on Table I. The store pitch angles for the remote pivot design with the remote pivot located at the store center of gravity are also shown on Table I. The single pivot with the three-inch forward pivot location has the largest pitch angle. The largest pitch angle for the remote pivot design, which is 3.2°, is smaller than the largest pitch angle for the single pivot designs. This smaller pitch angle will result in a lower alignment force requirement for the same pitch spring rate.

TABLE I

| | | $\eta_Z =$ 11.5 PULL UP | | | | $\eta_Z =$ 6.5 g PUSH OVER | | | |
|---|---|---|---|---|---|---|---|---|---|
| | $\theta_A =$ | +4 RAD/SEC$^2$ | | −4 RAD/SEC$^2$ | | +4 RAD/SEC$^2$ | | −4 RAD/SEC$^2$ | |
| | $\eta_X =$ | +1.5 g | −1.5 g | +1.5 g | −1.5 g | +1.5 g | −1.5 g | +1.5 g | −1.5 g |
| Feasibility Study | $\alpha = 0$ | −3.10° | −1.66° | −1.79° | −.359° | −2.78° | −1.35° | −1.48° | −.048° |
| Configuration | $\alpha = \alpha_{MAX}$ | .81° | 2.25° | 2.11° | 3.55° | −4.11° | −2.67° | −2.81° | −1.37° |
| Current Design | $\alpha = 0$ | −3.6° | −1.2° | −2.1° | .29° | −3.6° | −1.2° | −2.1° | .30° |
| Single Pivot | $\alpha = \alpha_{MAX}$ | 0.32° | 2.7° | 1.8° | 4.2° | −4.9° | −2.5° | −3.40° | −1.0° |
| Single Pivot | $\alpha = 0$ | −2.0° | .39° | −.43° | 1.9° | −4.5° | −2.1° | −2.9° | −.57° |
| 3″ Fwd Pivot | $\alpha = \alpha_{MAX}$ | 1.8° | 4.1° | 3.3° | 5.7° | −5.7° | −3.4° | −4.2° | −1.8° |
| Current Design | $\alpha = 0$ | −1.9° | −1.9° | −.84° | −.83° | −1.9° | −1.9° | −.84° | −.83° |
| Remote Pivot | $\alpha = \alpha_{MAX}$ | 2.0° | 2.0° | 3.0° | −3.2° | −3.2° | −3.2° | −2.2° | −2.1° |

There is also a military specification requirement that variations of ±3 inches in the store center of gravity be included in the loads analysis. These variations in loadings have been evaluated on the remote pivot design. The results of these additional analyses are shown on Table II. The maximum store pitch angle is higher for both the forward and aft store center of gravity locations than it is for the nominal store center of gravity location. A pylon design with pitch angle stops set at ±4° and a remote pivot would only reach the stops if the store center of gravity is three inches aft for the military specification loads.

TABLE II

EFFECT OF STORE CENTER-OF-GRAVITY VARIATION UPON PITCH ANGLE REMOTE PIVOT DESIGN

| | | $\eta_Z =$ 11.5 PULL UP | | | | $\eta_Z =$ 6.5 g PUSH OVER | | | |
|---|---|---|---|---|---|---|---|---|---|
| | $\theta_A =$ | +4 RAD/SEC$^2$ | | −4 RAD/SEC$^2$ | | +4 RAD/SEC$^2$ | | −4 RAD/SEC$^2$ | |
| | $\eta_X =$ | +1.5 g | −1.5 g | +1.5 g | −1.5 g | +1.5 g | −1.5 g | +1.5 g | −1.5 g |
| Center of Gravity | $\alpha = 0$ | −3.48° | −3.46° | −2.47° | −2.46° | −0.95° | −0.94° | 0.05° | 0.06° |
| 3″ FWD | $\alpha = \alpha_{MAX}$ | 0.40° | 0.41° | 1.40° | 1.42° | −2.27° | −2.26° | −1.27° | −1.26° |
| Nominal | $\alpha = 0$ | −1.88° | −1.87° | −0.84° | −0.83° | −1.88° | −1.87° | −0.84° | −0.83° |
| | $\alpha = \alpha_{MAX}$ | 1.99° | 2.01° | 3.03° | 3.04° | −3.20° | −3.19° | −2.82° | −2.15° |
| Center of Gravity | $\alpha = 0$ | −.31° | −0.30° | 0.80° | 0.81° | −2.83° | −2.82° | −1.72° | −1.71° |
| 3″ AFT | $\alpha = \alpha_{MAX}$ | 3.57° | 3.58° | 4.68° | 4.69° | −4.14° | −4.13° | −3.03° | −3.02° |

As a result of the previously described feasibility analysis, the alignment system gain requirement was determined. The alignment gain and the store pitch deflection is used to determine the alignment system power requirement. The gain value determined during the feasibility analysis was 7500 lbs./in.-sec. Using this value and the maximum pitch angle shown on Table I for the feasibility analysis design, the maximum power required was 11.6 horsepower. The remote pivot design reduces the maximum store pitch angle, the alignment system force requirement, and the power requirement. The power requirement for the remote pivot design is 4.4 horsepower. This power requirement is reduced further by using rational rather than military specification F-16 loads to determine the store pitch angle. A value of 1.6 horsepower has been set as the requirement for the designer to use in the selection of an alignment system drive system.

The remote pivot pylon configuration rather than the single pivot pylon configuration was selected as the configuration to be used for the F-16 aircraft decoupler pylon. In summary, the selection of the remote pivot configuration over the single pivot configuration was made on the basis of lower alignment loads and smaller rotation of the pylon during operation.

In describing the preferred embodiment of the invention, specific terminology has been resorted to for the sake of clarity and specific material compositions for the various parts have been described. However, the invention is not intended to be limited to the specific terms and materials so selected, and it is to be understood that each specific term and material described is intended to include all equivalents which could operate in a similar manner to accomplish a similar purpose.

Thus, although the invention has been described relative to a specific embodiment thereof, it is not so limited and numerous variations and modifications thereof will be readily apparent to those skilled in the art in the light of the above teaching. It is therefore to be understood that within the scope of the appended claims the invention may be practiced otherwise than as specifically described.

What is claimed as new and desired to be secured by Letters Patent of the United States is:

1. A device for suspending a store from an aircraft support structure including an airfoil lifting surface subjected to flutter comprising:
   store means;
   dual link pivot means for suspending said store means from said airfoil lifting surface and for enabling movement of said store means about a remote pivot axis;
   spring means connected between said airfoil lifting surface and said store means;
   control means actuated by movement of said spring means;
   said spring means and said control means maintaining alignment of said store means about a spanwise axis of the lifting surface and isolating the pitch modes of the store means from the torsion modes of the airfoil lifting surface and thereby alleviating airfoil lifting surface flutter and vibratory modes,
   an upper pylon section fixed to said airfoil lifting surface,
   a movable lower pylon section spaced from said upper pylon section and connected thereto by said dual link pivot means,
   damper means connected between said upper pylon and one end of said lower pylon and serving to dampen transient oscillations of said store means,